Nov. 11, 1930.  A. I. FISCHER  1,781,222
PIPE JOINT OR CONNECTION
Filed April 9, 1928
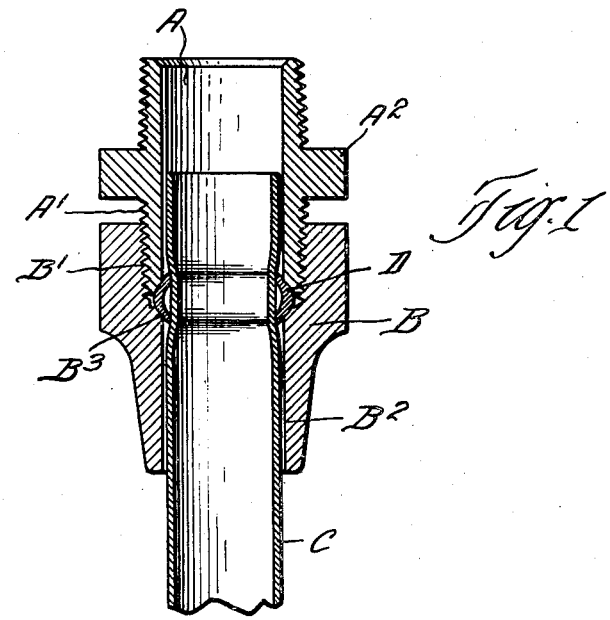
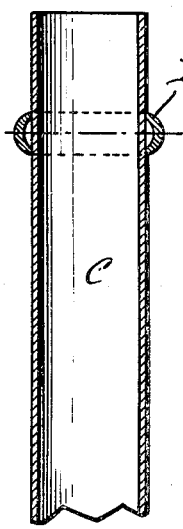
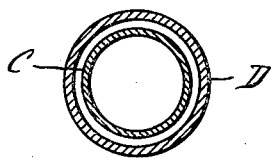
Inventor
A. I. Fischer Patented Nov. 11, 1930

1,781,222

UNITED STATES PATENT OFFICE

ARTHUR I. FISCHER, OF CLEVELAND HEIGHTS, OHIO, ASSIGNOR TO THE REPUBLIC BRASS COMPANY, OF CLEVELAND, OHIO, A CORPORATION OF OHIO

PIPE JOINT OR CONNECTION

Application filed April 9, 1928. Serial No. 268,529.

This invention relates generally to pipe couplings or joints and more particularly to an improved means for connecting pipes of different metal and is especially adapted for use upon copper and lead pipe.

The object of the invention is to provide an exceedingly cheap and simple combination of elements which will effectively connect the parts together and which will also enable a slip joint to be quickly and easily effected.

Broadly speaking, the invention consists in the utilization of a ring channel shaped in cross section and of a material somewhat harder than the material of the pipe upon which it is used, this channel shaped ring being forced into swaged engagement with the pipe which it is designed to secure. The invention consists also in certain details of construction, all of which will be hereinafter more fully described and set forth in the appended claim.

In the drawing forming a part of this specification, Fig. 1 is a sectional view showing the practical application of my invention; Fig. 2 is a detail sectional view of a piece of pipe with the ring arranged thereon and prior to the completion of the swaging operation; and Fig. 3 is a horizontal section taken on the line 3—3 of Fig. 2.

In carrying out my invention, I employ the usual construction of coupling members A and B, the member A being externally threaded at A' and provided with the hexagonal collar $A^2$. The member B is internally threaded as shown at B' and the bore $B^2$ is usually somewhat smaller than the diameter of the internally threaded portion B' thereby providing a shoulder $B^3$. C indicates the pipe to be united to the coupling members A and B which pipe is copper or lead or some other suitable material. Its diameter is such that it fits snugly into the bore $B^2$ of the coupling member B.

After the end of the pipe C has been inserted into the coupling member B there is placed thereon a ring D channel shaped in cross section as most clearly shown and preferably of brass or some other suitable material, that is to say, some material harder than the material from which the pipe C is made.

This ring D contacts with the shoulder $B^3$ and when the member A is screwed into the member B the inner end thereof comes in contact with the ring D and the edges of this ring are forced into swaged engagement with the pipe C making a tight union between these several parts.

In effecting this swaging or compressing operation, the edges are forced into the pipe C to such an extent that there is a slight contraction of the internal diameter of this pipe C at the point where the connection is effected as most clearly shown in Fig. 1.

It will thus be readily seen that it is only necessary to slip the brass ring upon the coupling pipe and adjust the pipe and ring in their proper relative positions with reference to the members A and B and then tighten up said members. The tightening operation not only serves to connect the members A and B together but also to swage the ring D into the pipe C.

Having thus described my invention, what I claim is:

In a pipe joint the combination of a pipe, a coupling member slidably receiving said pipe, said coupling member having a counterbore providing a shoulder, a non-divided metallic clamping and sealing ring channel shaped in cross section with both edges projecting inwardly closely fitting about said pipe and seated in said counter-bore, said ring being of a metal materially harder than said pipe, a gland member about said pipe extending into said counterbore, and means on said coupling member and gland member whereby they may be forced together to compress said metallic ring and force both edges of the same into said pipe, said pipe when in sealed condition having a depressed band portion extending inwardly and receiving said ring, said band being of a width as great as the width of said ring and receiving the same in tight sealing relation.

In testimony whereof, I hereunto affix my signature.

ARTHUR I. FISCHER.